Patented Jan. 8, 1952

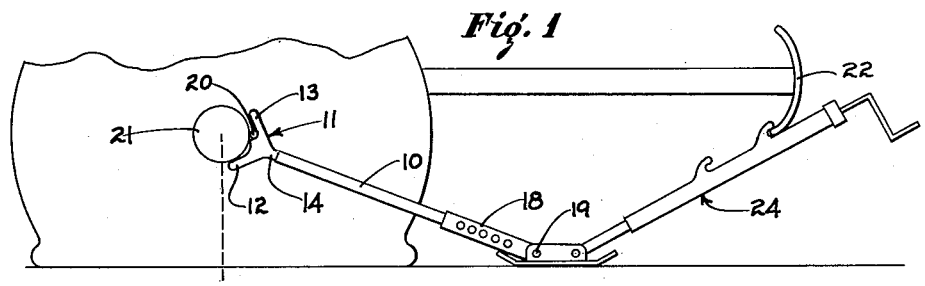
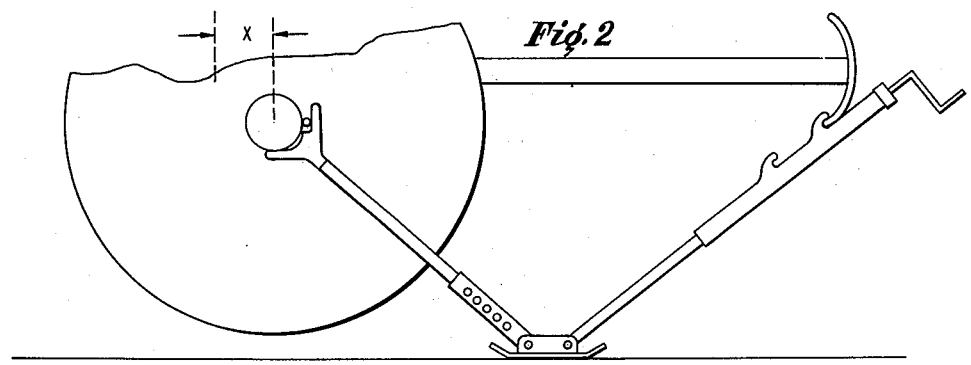
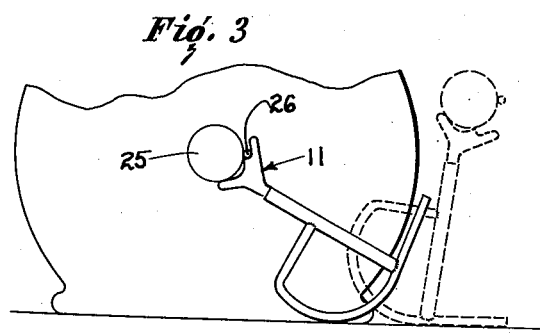
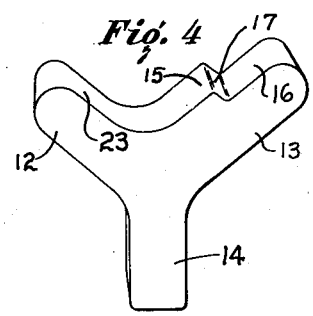
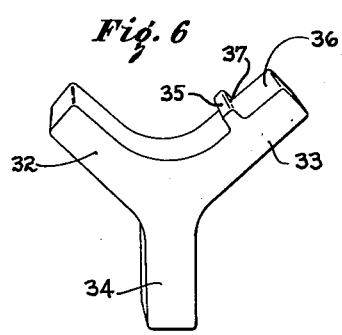
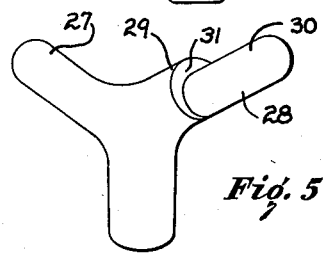

2,581,688

UNITED STATES PATENT OFFICE 2,581,688

VEHICLE LIFTING STRUT

Hubert E. Miller, Wichita, Kans., assignor to Robert M. Carey and Loftin W. Schmucker, Wichita, Kans.

Application August 19, 1949, Serial No. 111,307

6 Claims. (Cl. 254—133)

This invention relates generally to vehicle jacks and more particularly to a vehicle lifting strut adapted to be placed at an angle against a fixed part of a vehicle, such as the axle, and to apply a lifting force to the said fixed vehicle part when the entire vehicle is forced to move along the surface supporting it, thus pivoting the strut about its lower end into a more nearly upright position.

In the mass production of automobiles in this country it is customary for the manufacturer to install the rear hydraulic brake fluid lines along the trailing surface of the rear axle housing, at or slightly above a horizontal diametral plane passing through the normally cylindrical housing. Since these lines are in the form of thin walled tubes, they are easily crushed or broken. Due to the specified location of these brake fluid lines, the nesting or axle receiving and supporting end of presently available lifting struts comes into direct contact with the line when the lifting operation begins, and promptly crushes the line, rendering the brake system inoperative.

It is the chief object of this invention to provide a vehicle lifting strut of the class referred to, which is provided with an axle nesting and supporting end which is so constructed that its axle contacting surfaces avoid contact with brake fluid lines in the above specified positions, and hence avoid injuring the lines in any way during the lifting operation.

It is another object of the invention to provide a lifting strut having the characteristics just mentioned which may be used as a component part of a V-type jack, which may be used in conjunction with an ordinary bumper jack, or which may be used in a rocker type lifting cradle commonly used in garages.

It is another object to provide an axle nesting unit for attachment to present lifting struts to render them capable of contacting and lifting the rear axle of a vehicle without contacting or damaging a brake fluid line installed on the trailing surface thereof.

The invention, together with other objects attending its production, will be more clearly understood when the following description is read in connection with the accompanying drawings, which are presented for illustrative purposes only, and in which:

Fig. 1 is a schematic view illustrating the invention being used as a component part of a V-type vehicle jack, and shows the manner in which the upper end of the strut contacts the axle without contacting the brake fluid line;

Fig. 2 is a view similar to Fig. 1 and shows the relative positions of the parts after the wheel of the vehicle has been raised off the surface supporting it;

Fig. 3 is a side view of a rocker type vehicle lifting cradle embodying one form of this invention, and shows the relative positions of the parts at the start of the lifting operation, and after its completion; and Figs. 4, 5, and 6 are perspective views illustrating three different axle nesting units embodying the invention, the Fig. 4 unit being the same as the one shown in Figs. 1, 2, and 3.

Referring particularly to Fig. 1 of the drawings, it will be seen that the lifting strut of this invention includes an elongated rigid member 10 provided at its outer end with a forked or bifurcated axle nest 11. The member 10 may be of solid bar stock, or may be tubular. The nest 11 is welded or otherwise rigidly secured to the end of the member 10, or it may be made integral therewith by forging or casting.

The nest 11 comprises two diverging arms 12 and 13, and a shank 14, all of which line in a plane common to the member 10. The adjacent inside surfaces of these two arms are the axle contacting and supporting surfaces. As more clearly seen in Fig. 4, the inside surface of the arm 13 includes an inwardly offset surface portion 15 adjacent the crotch of the fork, and a surface portion 16 which extends from the offset shoulder 17 to the outer end of the arm.

In Fig. 1 the lower end of the member 10 is shown seated in one end of a tubular socket 18, the other end of which is pivoted at 19 on the base of a V-type jack, the operation and construction of which is fully described in pending patent application Serial No. 25,703. In this illustration the most extreme conditions are shown; that is, the brake fluid line 20 is located in the horizontal diametral plane of the axle housing 21, the lowest horizontal position in which such lines are installed on any present day automobile; the distance between the axle housing 21 and the rear bumper 22 is exaggerated, thus requiring an extra long axle lifting strut; and the angle between the strut and the horizontal is only 22%, the lowest angle required for any present day automobile. Even under these extreme conditions it is plain to see that the axle housing 21 is contacted only by the surface 23 of the arm 12, and by the surface 15 of the arm 13. The surface 16 of the arm 13 is spaced outwardly from the trailing surface of the housing and clears the brake fluid line 20. As the axle housing 21 is raised by elongation of the jacking unit 24, and a consequent slight rearward movement of the entire vehicle, the shoulder 17 on the arm 13 moves gradually away from the brake fluid line, as will be clearly seen by comparing the relative positions of the nest 11 in Figs. 1 and 2. It will also be noted that the space between the trailing surface of the axle housing and the surface 17 of the arm 13 remains ample to accommodate the brake fluid line 20 during the lifting operation, and the line is neither injured or affected in any way by the lifting contact of the nest with the axle housing.

Turning to Fig. 3, another adaptation of the invention is shown. In this case each strut is made exactly as previously described, but instead of being used in connection with a V-type jack, a pair of spaced identical struts are fitted with rigid rockers forming a rigid unitary cradle for lifting and supporting a vehicle axle housing. As shown the struts are placed against the axle housing 25 at an angle, and the vehicle is then moved along its supporting surface, rocking the cradle into the position shown by the dotted lines, and simultaneously lifting the axle housing. The offset 17 in the inside surface of the arm 13 of the axle nest 11 again clearly protects the brake fluid line 26 against injury.

The axle nest shown in Fig. 5 differs from the Fig. 4 type by having its arms 27 and 28 substantially circular in cross section. The arm 28 has an inwardly offset supporting surface 29, a safety surface 30, and an abrupt shoulder 31 between the two mentioned surfaces. The outward offset serves the same purpose as described for the Fig. 4 embodiment.

The nest shown in Fig. 6 has diverging arms 32 and 33, and a shank 34. The arm 33 has an inwardly offset axle supporting surface 35, an outer safety surface 36, and an abrupt offset shoulder 37 between them. The offset surface 35 serves the same purpose as described for the other embodiments.

It should be mentioned that the real reason for extending the arms 13, 28, and 33 beyond their respective offset shoulders 17, 31, and 37 is for safety. The surfaces 16, 30, and 36 do not normally contact the axle housing during either the lifting or supporting of the housing, but those surfaces would immediately assume the load in case the axle housing accidentally moved outward beyond the respective shoulders 17, 31, and 37. In such case the brake fluid line might be damaged, but the car would be prevented from falling entirely off the strut, with possible serious injuries to a person removing a tire or otherwise working on or under the vehicle.

Having described the invention with sufficient clarity to enable those familiar with the art to construct and use it, I claim:

1. An improved weight lifting and supporting strut for lifting the axle of a vehicle comprising: an elongated rigid member having a rigid forked nest on one of its ends for receiving, holding, and supporting a vehicle axle, the two diverging arms of the nest lying in a plane common to the plane of the said rigid member, the adjacent inside surfaces of the two arms being adapted to serve as the axle nesting and supporting surfaces, the inside or supporting surface of one arm including two offset surfaces, the surface nearer the outer end of the said one arm being offset outwardly to clear a brake fluid line or the like on an axle being lifted or supported, the outwardly offset surface of said one arm being adapted to carry axle weight only in case of accidental shifting of the axle in the nest.

2. An improved axle supporting strut for lifting the axle of a vehicle comprising: an elongated rigid member; and a fork type axle nest on one end thereof, the arms of the fork lying in the plane of the rigid member, the inside surfaces of the arms of the fork being adapted to receive and support an axle therebetween, that portion of the inside surface of one arm nearer its outer end being offset outwardly with relation to the remaining portion of the surface which is nearer the crotch, whereby an axle may normally be supported in the nest by contact with the said surface portion nearer the crotch and with the inside surface of the other arm, leaving the offset portion of the inside surface of the said one arm normally spaced from the axle surface to accommodate an easily damaged brake fluid line or the like mounted on the axle being lifted or supported.

3. An improved weight supporting strut for a vehicle jack comprising: an elongated rigid member having a rigid forked or bifurcated nest on one of its ends for receiving lifting, and supporting a vehicle axle, one arm of the nest being of substantially uniform cross sectional size from the crotch of the fork to its outer end, the other arm being of approximately the same cross sectional size from its outer end inward for approximately two-thirds of its length, the remaining portion being the axle contacting portion and being considerably greater in cross sectional size, the major increase in size occurring along the axle supporting inside surface, an abrupt shoulder being formed between the portions of different cross sectional size, so as to clear a brake fluid line or the like on an axle.

4. In a jack which lifts a part of a vehicle as a result of movement of the entire vehicle along a supporting surface while one of its axles is held on a freely movable end of an inclined strut, the other end of which is held only against translational movement, said strut being free to move from its inclined position to a substantially upright position during the rolling movement of the vehicle, the strut thereby forcing the said axle to move upward along the arcuate path traveled by the said freely movable end of the strut, an improved axle contacting nest for the freely movable end of said strut, comprising: two rigidly connecting diverging arms lying in a plane common to the plane of the strut, the adjacent inside surfaces of the two arms being adapted to serve as axle supporting surfaces, the inside or supporting surface of one arm including two offset surfaces, the surface nearer the outer end of the said one arm being offset outwardly to clear a brake fluid line or the like on an axle being lifted or supported, the outwardly offset surface being adapted to carry axle weight only in case of accidental shifting of the axle in the nest.

5. An axle supporting nest for the weight lifting strut of a vehicle jack comprising: a rigid integral body including a shank at one end and diverging arms at the opposite end, one of said arms having an inwardly offset surface intermediate its ends for contacting an axle surface and for normally preventing the remaining surface of the said arm from contacting the axle so as to clear a brake fluid line or the like on the axle.

6. An axle supporting nest for the lifting end of a jack strut comprising: a rigid body having two diverging arms, one of said arms having an inwardly offset surface intermediate its ends for contacting an axle surface and for normally preventing the remaining surface of said arm from contacting the axle surface, so as to clear a brake fluid line or the like on the axle.

HUBERT E. MILLER.

REFERENCES CITED

The following references are of record in the file of this patent:

UNITED STATES PATENTS

| Number | Name | Date |
|---|---|---|
| 1,514,262 | Santmyer | Nov. 4, 1924 |